(12) United States Patent
Chang et al.

(10) Patent No.: US 11,094,052 B2
(45) Date of Patent: Aug. 17, 2021

(54) METHOD OF COUNTING SHEET MATERIALS

(71) Applicant: GLOBALWAFERS CO., LTD., Hsinchu Science Park (TW)

(72) Inventors: Wei-Cheng Chang, Hsinchu Science Park (TW); Chia-Yeh Lee, Hsinchu Science Park (TW); Han-Zong Wu, Hsinchu Science Park (TW)

(73) Assignee: GLOBALWAFERS CO., LTD., Hsinchu (TW)

( * ) Notice: Subject to any disclaimer, the term of this patent is extended or adjusted under 35 U.S.C. 154(b) by 0 days.

(21) Appl. No.: 16/909,129

(22) Filed: Jun. 23, 2020

(65) Prior Publication Data

US 2021/0012481 A1   Jan. 14, 2021

(30) Foreign Application Priority Data

Jul. 12, 2019  (TW) ................................. 108124616

(51) Int. Cl.
*G06T 7/00* (2017.01)
*G06K 9/62* (2006.01)

(52) U.S. Cl.
CPC .......... *G06T 7/0004* (2013.01); *G06K 9/6279* (2013.01); *G06T 2207/30108* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 10,169,660 B1* | 1/2019 | Ren | G06Q 10/087 |
| 2004/0217261 A1* | 11/2004 | Auboussier | G06M 1/101 250/208.1 |
| 2018/0121782 A1* | 5/2018 | Barbadillo Villanueva | G06M 1/101 |

OTHER PUBLICATIONS

Wu, Ping-Huang, and Chin-Hwa Kuo. "A counting algorithm and application of image-based printed circuit boards." Journal of Applied Science and Engineering 12.4 (2009): 471-479. (Year: 2009).*
Suppitaksakul, Chatchai, and Meena Rattakorn. "Machine vision system for counting the number of corrugated cardboard." 2014 International Electrical Engineering Congress (iEECON). IEEE, 2014. (Year: 2014).*

* cited by examiner

*Primary Examiner* — David Perlman
(74) *Attorney, Agent, or Firm* — Lynette Wylie; Apex Juris, pllc (57) ABSTRACT

A method of counting sheet materials applied to a pile of sheet materials, comprising the steps of: receiving an image of the pile of sheet materials; obtaining a grayscale value of a plurality of pixels along a first image axis direction of the image to form an one dimensional first array; performing binarization of the first elements of the first array with a first threshold value to form an one dimensional second array; obtaining the number of the second elements of a first value appearing between two second elements of a second value in the second array to form a third array; dividing the elements of the third array into a first cluster and a second cluster with a second threshold value; counting the number of the third elements belonging to the first cluster and defining said number as the number of the first sheet materials.

14 Claims, 8 Drawing Sheets

METHOD OF COUNTING SHEET MATERIALS

BACKGROUND OF THE INVENTION

1. Technical Field

The present invention relates generally to the counting of sheet materials, and more particularly to the counting of two sheet materials with stagger arrangement by image recognition.

2. Description of Related Art

With the advancement of technology, it is now an era of automated manufacturing industry. For the manufacturer of sheet materials, after completing the manufacture, manufacturer will count the number of the sheet materials. Taking a chip manufacturer as an example, after cutting a single crystal ingot to form multiple chips, the manufacturer will execute the procedure of counting. Presently, the counting of the chips is carried out by a counting machine, while the conventional counting machine counts the number of chips by image recognition.

To avoid friction between the chips, the manufacturer will add a spacer sheet material, such as spacer paper, between the chips. Therefore, the image recognized by the counting machine shows the chips as well as the spacer sheet materials. However, when counting the chips by the image, the counting machine often mistakes the spacer sheet materials for the chips. Thus, the number counted by the counting machine will be different from the actual number of the chips, which brings inaccurate statistical results. In other words, the conventional counting machine is only able to count the number of sheet materials of a single thickness, and is unable to distinguish the difference between sheet materials of different thickness. In the application of counting chips and spacers, the difference between the counting number of chips and the actual number of chips is about 10% to 30%.

BRIEF SUMMARY OF THE INVENTION

In view of the above, the primary objective of the present invention is to provide a method of counting sheet materials, which can accurately count the number of sheet materials with stagger arrangement.

The present invention provides a method of counting sheet materials, which is applied to a pile of sheet materials including a plurality of first sheet materials and a plurality of second sheet materials, which are staggeringly arranged along an axial direction, wherein each of the second sheet materials is adjacent to each of the first sheet materials, and a thickness of each of the first sheet materials is greater than a thickness of each of the second sheet materials; the method of counting sheet materials is performed by an image processing module, including the steps of:

A. receiving an image of the pile of sheet materials;

B. obtaining a plurality of grayscale values of a plurality of pixels along a first image axial direction corresponding to the axial direction of the image, to form a first array which is one-dimensional, wherein the first array includes a plurality of first elements; values of the plurality of first elements are the grayscale values respectively;

C. performing binarization of the first elements of the first array with a first threshold value to form a second array which is one-dimensional, wherein the second array includes a plurality of second elements; a value of each of the plurality of second elements is one of a first value and a second value, wherein the first value is greater than the second value;

D. obtaining a number of the second elements of the first value appearing between two of the second elements of the second value in the second array, to form a third array, wherein the third array includes a plurality of elements which includes a plurality of third elements; a value of each of the plurality of third elements is the number of the second elements of the first value, which appears;

E. dividing the elements of the third array into a first cluster and a second cluster with a second threshold value, wherein values of the third elements belonging to the first cluster are not less than the second threshold value;

F. counting a number of the third elements belonging to the first cluster, and defining the number of the third elements belonging to the first cluster as a number of the first sheet materials.

The effect of the present invention is that, the method of counting sheet materials can classify the first sheet materials and the second sheet materials with different thicknesses, and precisely count the number of the sheet materials. Moreover, the method can effectively correct errors caused by the calculation of the number of two stacked sheet materials with different thicknesses.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
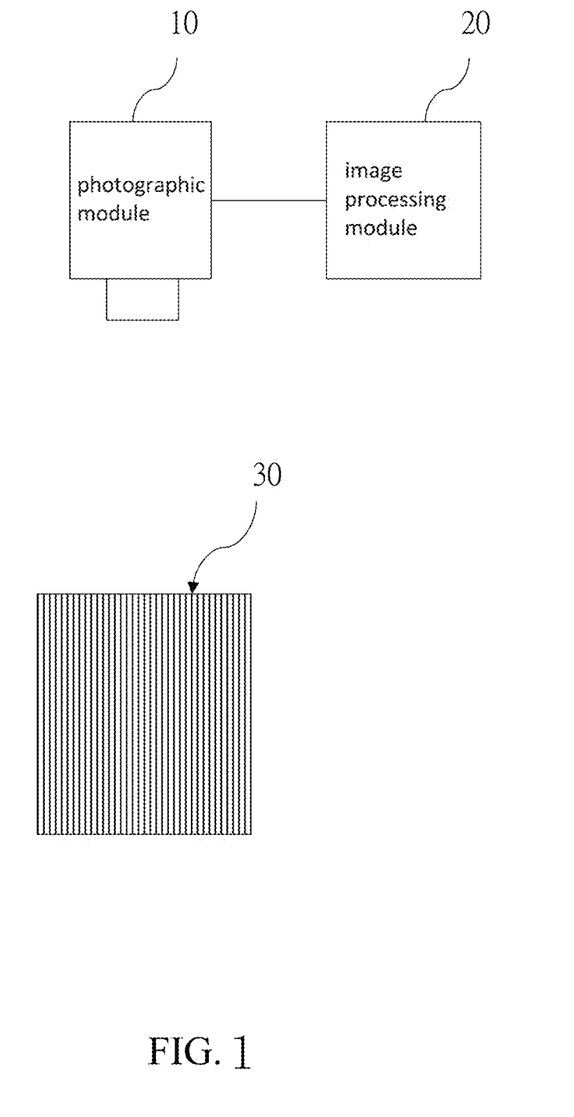
FIG. 1 is a schematic diagram of the image recognition system of the first preferred embodiment of the present invention.

FIG. 1 is an image recognition system used by a first preferred embodiment of the present invention, a method of counting sheet materials, including a photographic module 10 and an image processing module 20.

Figure 2:
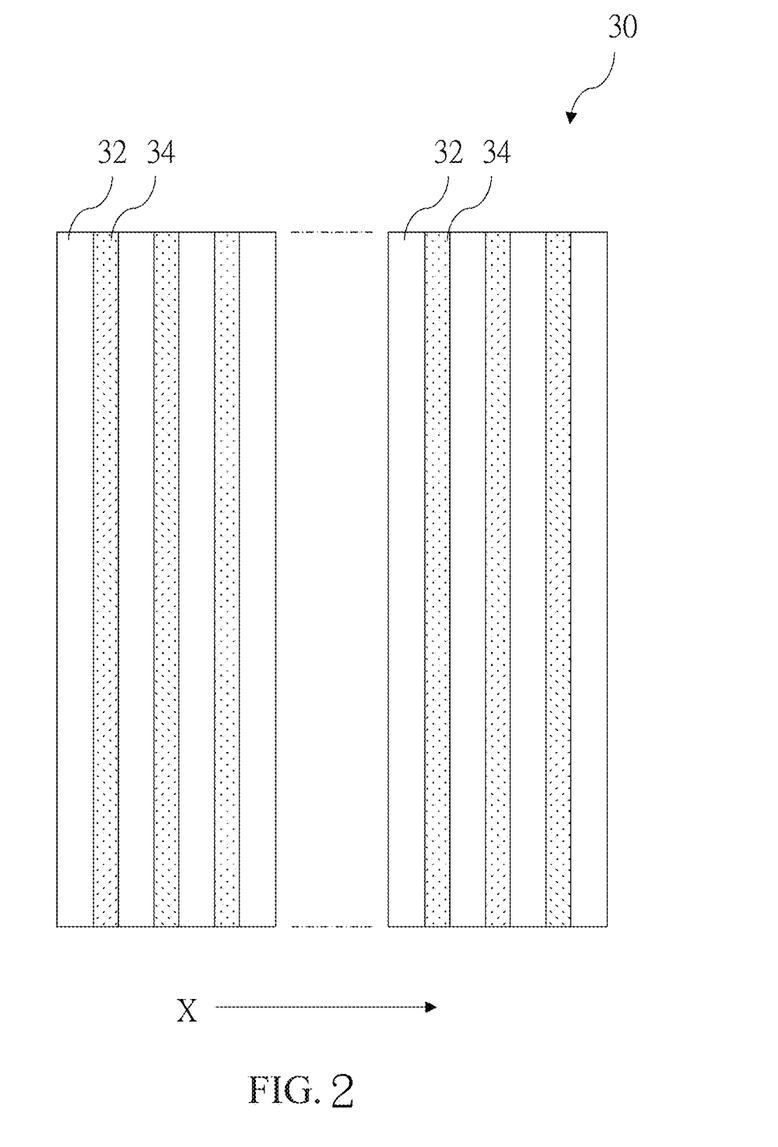
FIG. 2 is a schematic diagram of the pile of sheet materials of the first preferred embodiment.

The photographic module 10 is provided to capture a pile of sheet materials 30. As shown in FIG. 2, the pile of sheet materials 30 includes a plurality of first sheet materials using chips 32 as an example and a plurality of second sheet materials using spacer sheet materials 34 as an example, which are staggeringly arranged along an axial direction X. Each of the second sheet materials 34 is adjacent to each of the chips 32, wherein the thickness of each chip 32 is greater than the thickness of each spacer sheet material 34. Each of the chips 32 and each of the spacer sheet materials 34 has one side facing the photographic module. In this embodiment, each first sheet material is the chip 32, and each second sheet material is the spacer sheet material 34, but this is not a limitation of the present invention. In other embodiments, the first sheet materials can be spacer sheet materials 34 which are relatively thick, while the second sheet materials can be chips 32 which are relatively thin.

Figure 3:
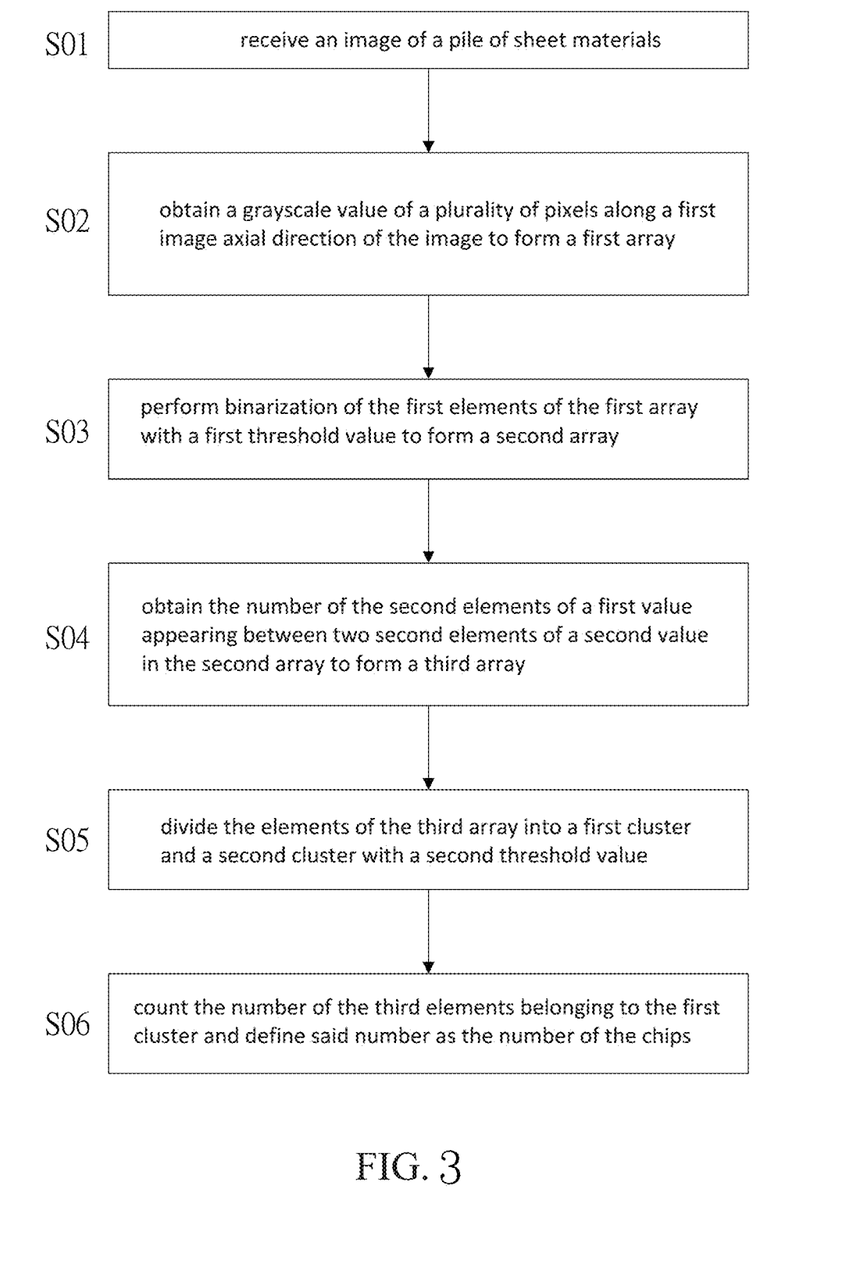
FIG. 3 is a flow chart of the first preferred embodiment.

The image processing module 20 is electrically connected to the photographic module 10, and is provided to carry out the first preferred embodiment, the method of counting sheet materials, of the present invention. Said method of counting sheet materials includes the following steps shown in FIG. 3.

Figure 4:
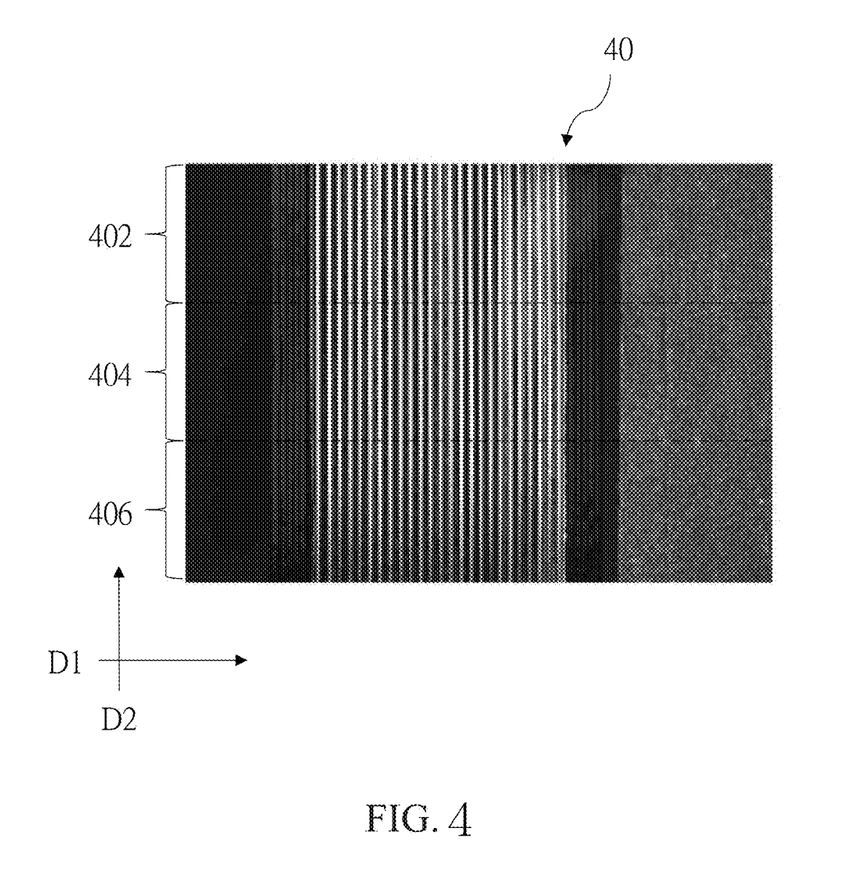
FIG. 4 is an image obtained by the photographic module of the first preferred embodiment.

Step S01: receive an image of the pile of sheet materials 30. In this embodiment, the image processing module 20 receives the image of the pile of sheet materials from the photographic module 10. As shown in FIG. 4, the image 40 has the image of the pile of sheet materials 30. The received image is defined with a first image axial direction D1 and a second image axial direction D2, which are perpendicular to each other. The first image axial direction D1 corresponds to the axial direction X along which the chips 32 and the spacer sheet materials 34 are arranged, while the second image axial direction D2 corresponds to the long lateral sides of each chip 32 and each spacer sheet material 34.

Step S02: obtain a plurality of grayscale values of a plurality of pixels along the first image axial direction D1 of the image 40 to form a first array which is one-dimensional. The first array includes a plurality of first elements, wherein the values of the first elements are the grayscale values.

In this embodiment, as shown in FIG. 4, the image processing module 20 divides the image 40 into a first area 402, a second area 404, and a third area 406 in order on the second image axial direction D2, wherein the second area 404 is provided between the first area 402 and the third area 406. Along the second image axial direction D2, the number of pixels of the second area 404 accounts for 30% to 50% of the total number of pixels from the first area 402 to the third area 406. Along the second image axial direction D2, the ratio of the number of pixels in the first area 402 to the third area 406 is between 0.9 and 1.1; in this embodiment, the ratio is 1. That is, the pixels in the first area 402 are equal to the pixels in the third area 406. In other words, the second area 404 is the middle area of the image 40. The image processing module 20 takes the second area 404 from the image 40 as a target area, wherein the second area 404 has a plurality of vertical pixels groups which are arranged side by side along the first image axial direction D1. Next, the image processing module 20 calculates the mean value of the grayscale values of the vertical pixels groups along the first image axial direction D1 in the second area 404 to obtain the grayscale value of the plurality of pixels along the first image axials direction D1, and thus to form the first array.

Figure 5:
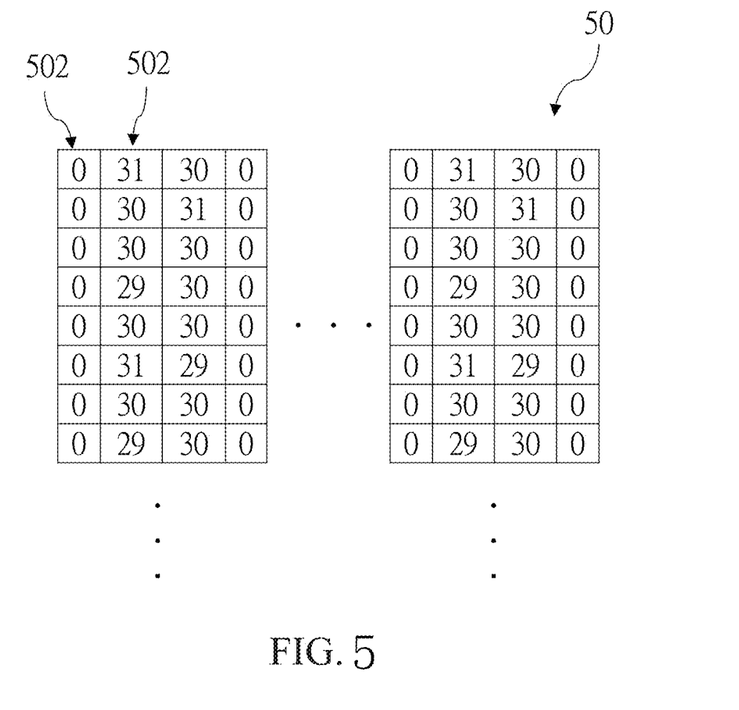
FIG. 5 is a schematic diagram of the pixel array of the first preferred embodiment.
Figure 6:
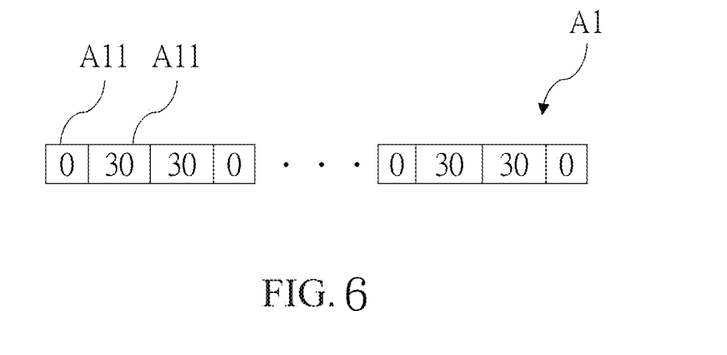
FIG. 6 is a schematic diagram of the first array of the first preferred embodiment.

For example, the number of the pixels on the second image axial direction D2 in the second area 404 is 400, while on the first image axial direction D1 in the second area 404 is 1000, which form a 400×1000 two-dimensional pixel array 50 as shown in FIG. 5. The value of each element of each vertical pixels group 502 of the pixel array 50 is the grayscale value of the corresponding pixel. That is, the second area 404 has 1000 vertical pixels groups 502 arranged side by side on the first image axial direction D1, and the number of the pixels of each vertical pixels group 502 is 400. The image processing module 20 calculates the mean value of the grayscale values of each vertical pixels group 502 to obtain the first array A1 with 1×1000 as shown in FIG. 6. Each of the first elements A11 in the first array A1 is the mean value of the grayscale values of each vertical pixels group 502 in FIG. 5.

Step S03: perform binarization of the first elements A11 of the first array A1 with a first threshold value to form a second array which is one-dimensional. The second array includes a plurality of second elements, wherein the value of each second element is one of a first value and a second value, and the first value is greater than the second value.

Figure 7:
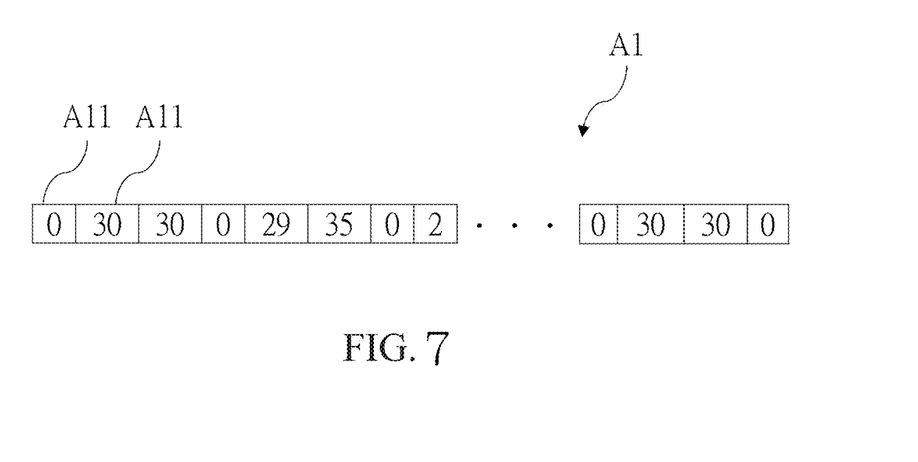
FIG. 7 is a schematic diagram of the first array of the first preferred embodiment.
Figure 8:
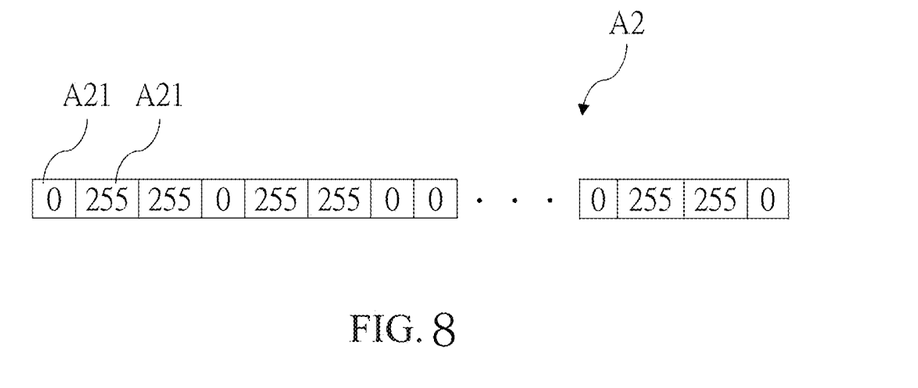
FIG. 8 is a schematic diagram of the second array of the first preferred embodiment.

Take the first array A1 as shown in FIG. 7 as an example, the image processing module 20 classifies the first elements A11 according to the first threshold value (e.g., 20). The first elements A11 greater than the first threshold value are set to be the first value (e.g., 255, representing all white), while the first elements A11 less than the first threshold value are set to be the second value (e.g., 0, representing all black), and accordingly forms the second array A2 as shown in FIG. 8. The values of the second elements A21 are the first value or the second value, becoming a binarized array.

In this embodiment, step S03 further includes a first threshold value setting step, provided for setting the first threshold value. The first threshold value setting step can be provided for setting the first threshold value in the image processing module 20 in advance, or, for obtaining the first threshold value from the statistics of the first elements A11. In this embodiment, the first threshold value setting step is provided to use a classification algorithm to perform statistics on the first elements A11, so as to obtain the first threshold value. Thus, the first threshold value which is fluctuant can be formed. In other words, the corresponding first threshold value can be automatically generated for each batch of the pile of sheet materials 30, and users don't need to manually reset the first threshold value. In more detail, by using the classification algorithm, the first elements A11 are divided into two groups, and the mean value of the first elements A11 of each group would be calculated, wherein the mean value of one of the groups is greater than the mean value of the other.

The classification algorithm can be k-mea ns algorithm, for example. Said k-means algorithm randomly divides the first elements A11 into two groups, calculates the mean value multiple times, and classifies the first elements based on the mean value. Until the previous mean value and the present mean value converge to be consistent, the first elements A11 are divided into two groups.

Next, defines the smallest value among the first elements in the group with greater mean value as a first predetermined value, and defines the largest value among the first elements in the group with smaller mean value as a second predetermined value. Set the first threshold value to fall between the first predetermined value and the second predetermined value. In this embodiment, the first threshold value is the mean value of the first predetermined value and the second predetermined value.

Step S04: obtain the number of the second elements A21 of the first value appearing between two second elements A21 of the second value in the second array A2 to form a third array. The third array includes a plurality of elements which includes a plurality of third elements, wherein the value of each third element is the number of the second elements of the appearing first value.

For example, the second elements A21 in the second array A2 are arranged consecutively, representing the pixels in the first image axial direction D1. Therefore, in the second elements A21, the second elements A21 of the first value (e.g., 255) appearing between two second elements A21 of the second value (e.g., 0) exactly represent the pixels of the chips 32 or the spacer sheet materials 34. In other words, between two second elements A21 of the second value, the number of the second elements A21 of the first value corresponds to the thickness of the chips 32 or the spacer sheet materials 34. The image processing module 20 records in the third array A3 shown in FIG. 9, the value of each of the third elements A31 corresponds to the thickness of the chips 32 or the spacer sheet materials 34 recognized from the image 40. The number of the third elements A31 (e.g., 49) corresponds to the number of the chips 32 or the spacer sheet materials 34 recognized from the image 40.

Moreover, in this embodiment, including a plurality of fourth elements added in the third array A3 and equal to the number of the third elements A31 in the third array A3, the value of each fourth element is less than any of the values of the third elements A31. For example, as shown in FIG. 10, the number of the added fourth elements A32 is 49, and the value of each fourth element A32 is 0. That is, the elements of the third array A3 includes the third elements shown in FIG. 9 as well as the fourth elements A32 shown in FIG. 10.

Step S05: divide the elements of the third array into a first cluster and a second cluster with a second threshold value, wherein the values of the third elements A31 belonging to the first cluster are not less than the second threshold value.

Figure 9:
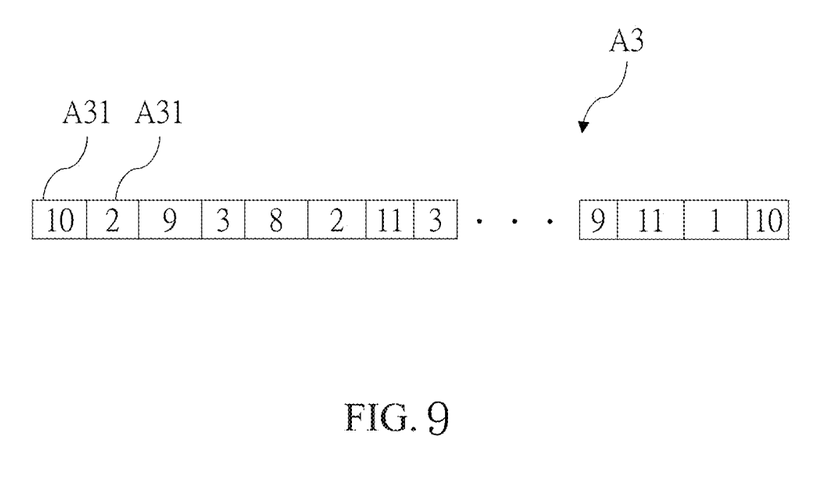
FIG. 9 is a schematic diagram of the third array of the first preferred embodiment.
Figure 10:
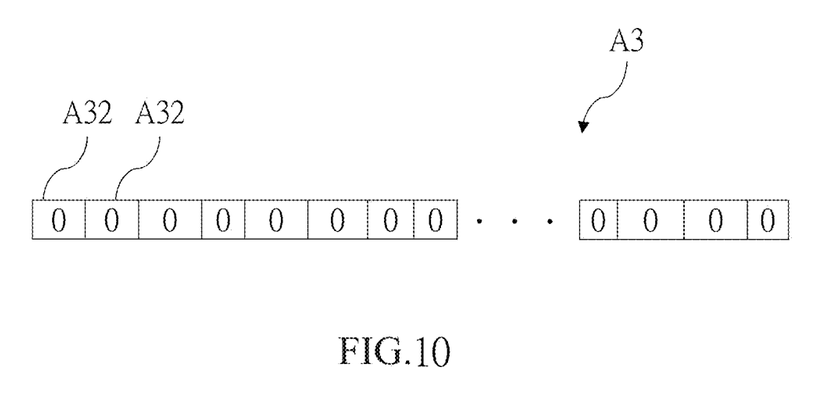
FIG. 10 is a schematic diagram of the fourth elements of the third array of the first preferred embodiment.
Figure 11:
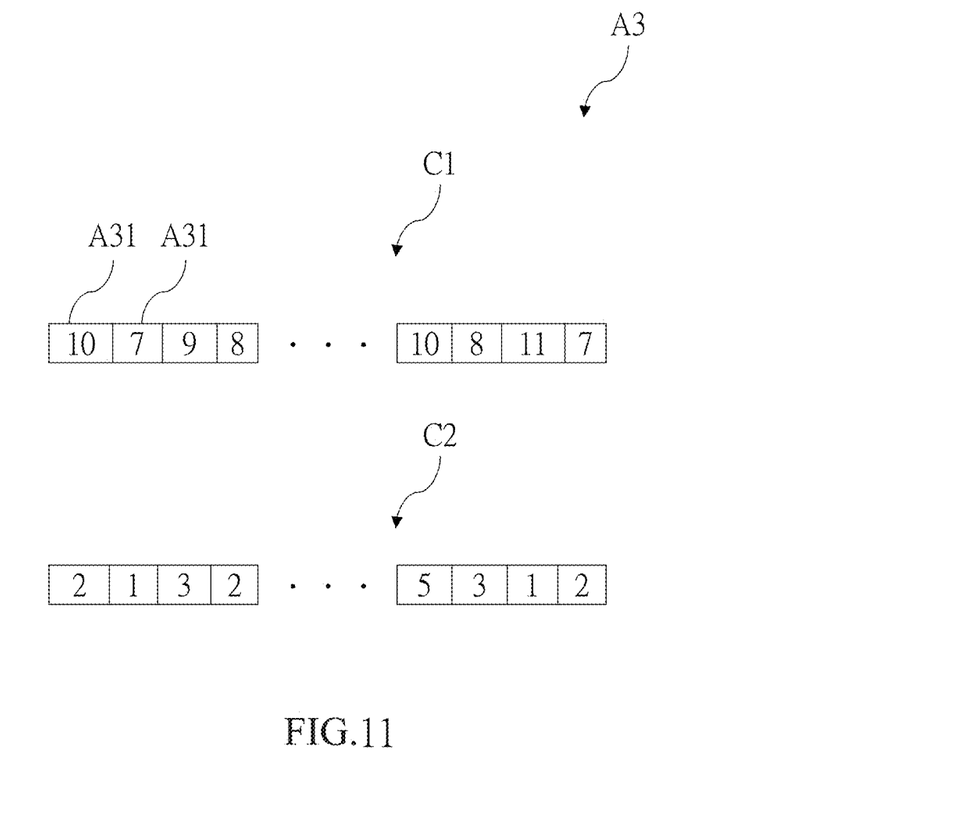
FIG. 11 is a schematic diagram of the clusters in the third array of the first preferred embodiment.

Take the third array A3 shown in FIG. 9 and FIG. 10 as an example, the image processing module 20 classifies the elements of the third array A3 according to the second threshold value (e.g., 6). As shown in FIG. 11, the elements greater than or equal to the second threshold value are classified as the first cluster C1, while the elements less than the second threshold value are classified as the second cluster C2.

In this embodiment, step S05 further includes a second threshold value setting step, which is provided to set the second threshold value. The second threshold value setting step can be setting the second threshold value in the image processing module 20 in advance, and also can be obtaining the second threshold value from performing statistics on the elements of the third array A3. In this way, the fluctuant second threshold value can be formed. In other words, the corresponding second threshold value can be automatically generated for each batch of the pile of sheet materials 30, and users don't need to manually reset the first threshold value. In this embodiment, the second threshold value setting step is using a classification algorithm to perform statistics on the elements of the third array A3, so as to obtain the second threshold value. In more detail, by using the classification algorithm, the elements of the third array A3 are divided into two groups, and the mean value of the elements of each group would be calculated, wherein the mean value of one of the groups is greater than the mean value of the other.

The classification algorithm can be k-mea ns algorithm, for example. Said k-means algorithm randomly divides the elements of the third array A3 into two groups, calculates the mean value multiple times, and classifies the elements of the third array A3 based on the mean value. Until the previous mean value and the present mean value converge to be consistent, the elements of the third array A3 are divided into two groups.

Next, defines the smallest value among the elements of the third array A3 in the group with greater mean value as a first predetermined value, and defines the largest value among the elements of the third array A3 in the group with smaller mean value as a second predetermined value. Set the second threshold value to fall between the first predetermined value and the second predetermined value. In this embodiment, the second threshold value is the mean value of the first predetermined value and the second predetermined value.

Step S06: count the number of the third elements A31 belonging to the first cluster C1 and define said number as the number of the chips 32.

As shown in FIG. 11, the number of the third elements A31 in the first cluster C1 is exactly the number of the counted chips 32 (e.g., 24). Thus, the image processing module 20 can estimate the number of the chips 32. The number of the spacer sheet materials 34 is the number of all the third elements A31 minus the number of counted chips 32 (e.g., the number of the spacer sheet materials 34 is 25), or the number of the elements in the second cluster C2 minus the number of the fourth elements A32 (i.e., the number of non-zero elements).

In the above, the purpose of adding the fourth elements A32 in step S04 is to reduce the mean value of the classification algorithm, so that the classification in step S05 can be more obvious. In practice, the step of adding the fourth elements A32 can be omitted, and only the third elements A31 are classified in step S05.

According the above, the method of counting sheet materials of the present invention can classify the first sheet materials and the second sheet materials with different thicknesses, and precisely count the number of the sheet materials. The present invention is not limited to count the number of chips. As long as the two sheet materials have different thicknesses and are arranged staggeringly, the method of the present invention can be used to count the number of sheet materials. When the method of the present invention is used to count chips and spacer sheet materials, the difference between the counted number of chips and the actual number of chips is less than 1%, which is less than the error of conventional counting machines (10-30%). Therefore, the method of the present invention can effectively correct errors caused by the calculation of the number of two stacked sheet materials with different thicknesses.

The embodiments described above are only preferred embodiments of the present invention. All equivalent methods which employ the concepts disclosed in this specification and the appended claims should fall within the scope of the present invention.

What is claimed is:

1. A method of counting sheet materials, which is applied to a pile of sheet materials comprising a plurality of first sheet materials and a plurality of second sheet materials, which are staggeringly arranged along an axial direction, wherein each of the second sheet materials is adjacent to each of the first sheet materials, and a thickness of each of the first sheet materials is greater than a thickness of each of the second sheet materials; the method of counting sheet materials is performed by an image processing module, comprising the steps of:

A. receiving an image of the pile of sheet materials;

B. obtaining a plurality of grayscale values of a plurality of pixels along a first image axial direction corresponding to the axial direction of the image, to form a first array which is one-dimensional, wherein the first array comprises a plurality of first elements; values of the plurality of first elements are the grayscale values respectively;

C. performing binarization of the first elements of the first array with a first threshold value to form a second array which is one-dimensional, wherein the second array comprises a plurality of second elements; a value of each of the plurality of second elements is one of a first value and a second value, wherein the first value is greater than the second value;

D. obtaining a number of the second elements of the first value appearing between two of the second elements of the second value in the second array, to form a third array, wherein the third array comprises a plurality of elements which comprises a plurality of third elements; a value of each of the plurality of third elements is the number of the second elements of the first value, which appears;

E. dividing the elements of the third array into a first cluster and a second cluster with a second threshold value, wherein values of the third elements belonging to the first cluster are not less than the second threshold value;

F. counting a number of the third elements belonging to the first cluster, and defining the number of the third elements belonging to the first cluster as a number of the first sheet materials.

2. The method of claim 1, wherein step C comprises a first threshold value setting step which is provided to set the first threshold value.

3. The method of claim 2, wherein the first threshold value setting step comprises the steps of:

using a classification algorithm to divide the first elements into two groups, and calculating a mean value of the first elements of each of the two groups, wherein the mean value of one of the two groups is greater than the mean value of the other group;

taking the smallest value among the first elements in one of the two groups with greater mean value as a first predetermined value, and taking the largest value among the first elements in the other group with smaller mean value as a second predetermined value; and setting the first threshold value as a value between the first predetermined value and the second predetermined value.

4. The method of claim 3, wherein the first threshold value is a mean value of the first predetermined value and the second predetermined value.

5. The method of claim 3, wherein the classification algorithm is k-means algorithm.

6. The method of claim 1, wherein step E comprises a second threshold value setting step, which is provided to set the second threshold value.

7. The method of claim 6, wherein the second threshold value setting step comprises the steps of:

using a classification algorithm to divide the elements of the third array into two groups, and calculating a mean value of the elements of each of the two groups, wherein the mean value of one of the two groups is greater than the mean value of the other group;

taking the smallest value among the elements of the third array in one of the two groups with greater mean value as a first predetermined value, and taking the largest value among the elements of the third array in the other group with smaller mean value as a second predetermined value; and setting the second threshold value as a value between the first predetermined value and the second predetermined value.

8. The method of claim 7, wherein the second threshold value is a mean value of the first predetermined value and the second predetermined value.

9. The method of claim 7, wherein the classification algorithm is k-means algorithm.

10. The method of claim 7, wherein step D comprises the step of:

adding a plurality of fourth elements in the third array, wherein a number of the plurality of fourth elements is equal to a number of the third elements; a value of each of the plurality of fourth elements is less than any one of values of the third elements.

11. The method of claim 10, wherein the value of each of the plurality of fourth elements is 0.

12. The method of claim 1, wherein step B comprises the steps of:

Taking a target area in a second image axial direction perpendicular to the first image axial direction in the image, wherein the target area has a plurality of vertical pixels groups which are arranged side by side along the first image axial direction;

calculating a mean value of grayscale values of each of the vertical pixels groups along the first image axial direction in the target area, to obtain the grayscale values of the plurality of pixels of the first image axials direction, and thus to form the first array.

13. The method of claim 12, wherein the target area is a middle area in the second image axial direction of the image.

14. The method of claim 13, wherein in the step B, the image is divided into a first area, a second area, and a third area in order on the second image axial direction; the second area forms the target area; along the second image axial direction, a number of pixels of the second area accounts for 30% to 50% of a total number of pixels from the first area to the third area.

* * * * *